June 14, 1927.

J. W. WALKER 1,632,638

CULTIVATOR

Filed Aug. 2, 1926

INVENTOR
James N. Walker.
By J. H. Weatherford
ATTORNEY

June 14, 1927. 1,632,638
J. W. WALKER
CULTIVATOR
Filed Aug. 2, 1926 2 Sheets-Sheet 2
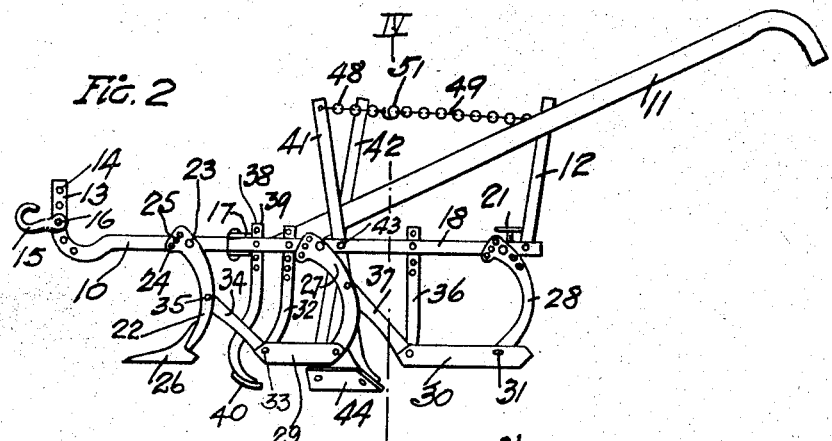
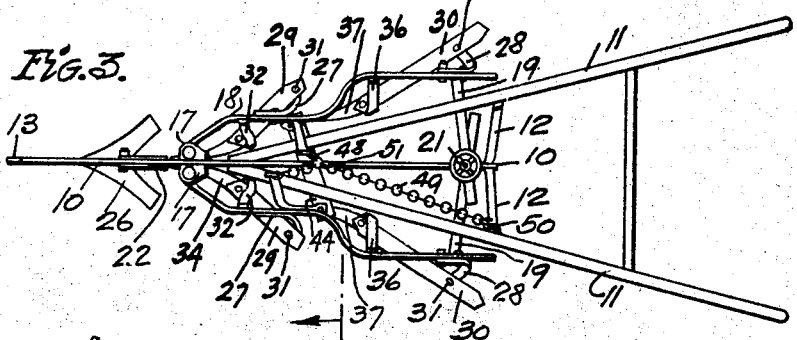
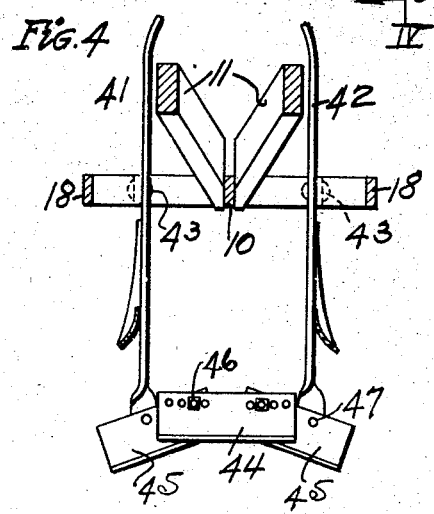
INVENTOR
James W. Walker
By J. H. Weatherford
ATTORNEY.

Patented June 14, 1927.

UNITED STATES PATENT OFFICE.

JAMES W. WALKER, OF MEMPHIS, TENNESSEE.

CULTIVATOR.

Application filed August 2, 1926. Serial No. 126,432.

This invention relates to improvements in cultivators, and has especial relation to a device for preparing the soil for planting, and for cultivating the soil after planting and during the growth of the plants.

It has especial relation also, to a cultivator in which the angle and depth at which the blades are set to cut can be readily regulated and further to a regulating means which will not only regulate the depth of cut but will also smooth the surface between the blades.

The objects of the invention are, (a) To provide means for regulating the depth of cut of the cultivator blades with reference to the lead shovel;

(b) To provide means for regulating the depth of cut of the front set of cultivator blades with reference to the rear set of blades;

(c) To provide means for regulating the depth of the front end of each of the cultivator blades with reference to the rear end thereof;

(d) To provide means for regulating the lateral spacing of the cultivator blades;

(e) To provide means for regulating the depth of cut of the lead shovel;

(f) To provide means for regulating the depth of cut of the cultivator blades, and (g) To provide means for smoothing and shaping the surface between the blades.

The means by which the foregoing and other objects are accomplished, and the manner of their accomplishment, readily will be understood from the accompanying description on reference to the drawings, in which,—

Fig. 2 is a side elevation showing both depth regulators, in approximately their lowest position.

Fig. 3 is a plan view of the cultivator.

Fig. 4 is a sectional elevation on the line IV—IV of Figs. 2 and 3, showing especially the detail of the smoothing board feature of the rear depth regulator.

Figure 1:
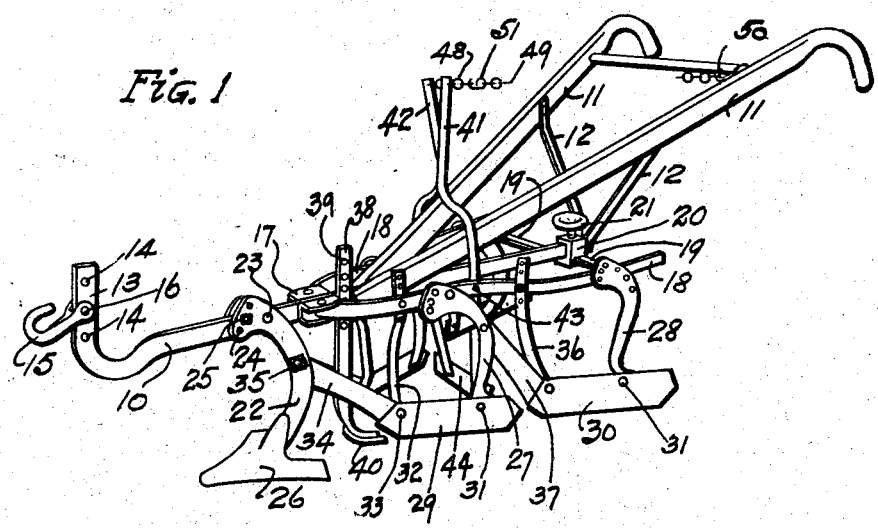
Fig. 1 is a perspective view of my cultivator.

Referring now to the drawings, in which the various parts are indicated by numerals, the cultivator comprises a central draft beam 10, having handles 11 secured thereto intermediate the length of the beam and braced from the rear end thereof by braces 12, all rigidly attached in any usual manner as by bolts to form the initial unit of the frame of the device. The front end 13 of the draft beam 10 is turned vertically upward and a plurality of holes 14 formed therein, in any one of which holes a clevis 15 may be secured, as by a removable pin 16, to provide regulation for the height of hitch. Secured to the beam 10, are brackets 17 in which the forward ends of similar oppositely disposed side bars 18 are pivotally secured for lateral swinging adjustment. 19 are oppositely disposed spreader bars, each having an end secured to one of the side bars 18, the inner end of one of said spreader bars being superimposed on the other within a clamp member 20, through which clamp-member the beam 10 also passes. 21 is a hand-wheel carrying a set screw which is adapted to clamp the beam 10 and spreader bars 19 against movement. This clamping device not only provides means permitting lateral adjustment of the side bars toward and away from each other, but also allows individual adjustment of each of said bars with reference to the beam 10, so that the angular adjustment of the cultivator blades with reference to the central beam and handle bars may be varied as may be desired. The draft beam and side bars assembly are hereinafter referred to as the "frame of the cultivator".

22 is a standard pivotally secured to the beam 10, forwardly of the bracket 17, as by a bolt or rivet 23, the standard being provided with holes 24 through any one of which a bolt 25 may be passed to vary the angular relation of the standard with reference to the frame. 26 is an ordinary double shovel carried by the standard 22.

On the side bars 18 intermediate their length are secured front cultivator-blade standards 27 and rear cultivator-blade standards 28, each of which standards are pivotally attached to the side frames and are angularly adjustable in relation thereto, as hereinbefore described for the standard 22. In addition, the rear pair of standards 28 is provided with additional pivotal holes, so that they may be vertically adjusted with reference to the side bars 18. Secured to each of the standards 27 is a front cultivator-blade 29 and to each of the standards 28 a rear cultivator blade 30, the attaching means being in each case a single bolt 31 so that the blades are pivotally secured to these standards.

Supporting the front end of each blade 29 is a hanger 32, the upper end of which is provided with a plurality of holes, through any one of which a suitable bolt may be passed to secure this hanger to its side bar 18 in such position of vertical adjustment as may be desired. The lower end of each hanger 32 is secured to the front end of a cultivator blade 29 by means of a bolt 33, which bolt at the same time serves to secure to these members a draft bar 34 which also acts as a coulter. The front end of both these draft bars is secured to the shovel standard 22 by means of a bolt 35. Similarly, the front end of each rear cultivator-blade 30 is supported by a hanger bar 36 and is provided with a draft bar 37, each of which bars is pivotally secured to a cultivator-standard 27. The method of attachment and supports for the two blades on the opposite sides of the cultivator is substantially identical.

It will be seen that by loosening the hand-wheel 21 the blades may be spread apart to such width as may be desired and may be shifted with angular relation to the beam 10, and that by raising or lowering the supporting bars 32, 36, the forward end of each front and rear cultivator blade may be raised or lowered as may be desired, the standards 27 and 28 being correspondingly moved to permit such adjustment.

It will further be seen that by raising a rear standard 28 with reference to its side bar 18 that the rear end of the blade carried thereby may be raised to permit such blade to conform to the shape of a seed bed, and that where both of the rear blades are thus raised the central portion of the cultivator may work in the trough or furrow between two of such seed beds, or similarly that should the two rear standards be lowered the cultivator blades would be set to ride on and shape the crown of a seed bed.

38 is a depth-regulator which is provided with suitable holes 39 through which it may be bolted or clamped, in desired positions of adjustment, to the beam 10. 40 is a shoe on the lower end of this regulator. By adjusting the height of this regulator the depth of the front end of the cultivator may be regulated. 41—42 are similarly shaped oppositely disposed bars or levers one of which is pivotally attached to one side frame 18 by a bolt or rivet 43, and the other thereof to the other side frame 18. The lower end of these levers carries a smoothing board 44 which board as will be seen by reference to Fig. 4 is preferably made up of a single plate 44 and two side plates 45, each provided with a number of holes 46 near the upper edge thereof. The plates 45 are each connected with the central plate 44 by a single bolt 47, and are connected to the arms 41, 42, each by a single bolt 47. To the upper ends of the levers 41 and 42 a cross chain 48 is attached, and this chain is in turn connected by a chain 49 to a hook 50 on one of the handle bars 11. The chain 49 is provided with a hook 51 which may be hooked into any link of the cross chain 48 so that should it be desired to pull one of the levers 41 further back than the other lever 42 it is only necessary to engage the hook 51 in such link nearer the lever 41, as may be desired. Such link of the chain 49 may then be engaged with the hook 50 as will give the proper depth regulation.

It will be seen that the construction herein shown possesses many advantages especially in that the two-piece construction of the cultivator blade and draft arm not only permits the adjustment of the level of the blade, but also provides means whereby the blade which is the part which wears may be readily replaced without replacing the draft bar, which latter takes little of the wear and lasts very much longer.

It further permits the draft bar to be made thin and flexible, whereby especially, the width adjustment, may be readily accomplished without the necessity of making the blade of corresponding thinness. The smoothing board not only performs this function, but acts as a depth regulator, and the independent regulation of each lever arm (41—42) makes it possible to set the cultivator blades for shallower depth on one side than on the other thereof. The chain attachment carries a simple and efficient means for such depth adjustment which it is practically impossible to dislodge accidentally and which may be quickly and easily changed by the operator of the cultivator without leaving his position behind the handle bars.

In using the cultivator the depth regulating shoe 40 is moved to such position as is desired and clamped. The side bars of the frame are set such distance apart as may be desired and the points or forward ends of the cultivator blades are adjusted to such height as may most satisfactorily perform the service to be rendered. Thereafter in using the cultivator the smoothing board is adjusted during use to such depth as the operator may wish. Should one of the blades wear out the same may readily be removed and only the part which is worn out be replaced. It will readily be understood that the drawings herein are illustrative only and that I do not desire to be limited to the construction or detail herein shown except as may be hereinafter set out in the claims.

Having thus disclosed the invention, what is claimed, is:—

1. In a cultivator having a central draft beam and side bars laterally adjustable, with reference thereto, a central standard depending from said draft beam, standards depending from said side bars, a blade pivotally attached to each of said latter standards, adjustable supporting members depending from said side bars pivotally attached to the forward end of each blade, and a draft member extending from each blade to the standard forward thereof.

2. In a cultivator having a frame, standards connected to said frame and depending therebelow, a blade pivotally attached to the lower end of one of said standards, a supporting member adjustably secured to said frame and pivotally attached to the forward end of said blade and a flexible draft member pivotally secured to the forward end of said blade, and to the standard forward thereof.

3. In a cultivator having a frame, a centrally disposed forward standard secured thereto and depending therefrom, stirring means carried by said standard, a pair of standards oppositely disposed secured to and depending from said frame, rearwardly of said first standard, a blade pivotally attached to each of said latter standards, hangers depending from said frame, each pivotally secured to the forward end of a blade, and a draft member pivotally secured to each of said blades and to a standard immediately forward thereof.

4. In a cultivator having a central draft beam and a side bar laterally adjustable with reference thereto, a central standard depending from said draft beam, a standard depending from said side bar, a blade pivotally attached to said latter standard, an adjustable supporting member depending from said side bar, and pivotally attached to the forward end of said blade, and a draft member extending from each blade to the standard forward thereof.

5. In a cultivator, having a frame and blades carried thereby, depth regulating means for said blades, comprising a pair of levers pivotally attached to opposite sides of said frame, a cross shoe having its ends secured one to each of the lower ends of said levers and means for adjusting the angularity of said levers.

6. In a cultivator, having a frame and blades carried thereby, depth regulating means for said blades, comprising a pair of levers pivotally attached to opposite sides of said frame, a cross shoe secured to the lower ends of said levers, a cross chain attached to the upper ends of said levers, an adjusting member securable to any link of said chain and means for retaining said adjusting member in desired position.

7. In a cultivator, having a frame and cultivator blades carried thereby, middle smoothing means, comprising, carrying means depending from said frame, side boards attached to said carrying means, and a central board pivotally attached to said side boards.

8. In a cultivator, having a frame, cultivator blades carried by said frame, and means for adjusting the lateral width of said frame, of middle smoothing means comprising a pair of levers, pivotally attached to said frames, a board having a plurality of holes in the upper edge thereof, attached to each of said levers, a central board having a plurality of similarly located holes therein, to provide means for securing said boards together in varying positions of lateral and angular adjustment, and means for varying the angularity of said levers to regulate the depth of said board.

9. In a cultivator having a frame, cultivator blades carried by said frame and means for varying the lateral width of said frame, levers pivotally attached to said frame, a smoothing board comprising a plurality of pieces attached to the lower ends of said levers, and means for varying the angular and lateral relation of said pieces.

In testimony of the foregoing, I affix my signature.

JAMES W. WALKER.